United States Patent [19]

Columberg

[11] 4,066,571

[45] Jan. 3, 1978

[54] OLEFIN-POLYMERIZATION CATALYSTS

[75] Inventor: Alfred Columberg, Geneva, Switzerland

[73] Assignee: Battelle Memorial Institute, Carouge, Switzerland

[21] Appl. No.: 658,112

[22] Filed: Feb. 13, 1976

[30] Foreign Application Priority Data

Feb. 17, 1975 Switzerland ..................... 1953/75

[51] Int. Cl.$^2$ .............................................. C08F 4/62
[52] U.S. Cl. .......................... 252/431 C; 252/429 B; 526/142; 526/143
[58] Field of Search ...................... 252/429 B, 431 C

[56] References Cited

U.S. PATENT DOCUMENTS

| | | | |
|---|---|---|---|
| 3,082,198 | 3/1963 | Klein | 252/429 B X |
| 3,381,047 | 4/1968 | Eleuterio et al. | 252/429 B X |
| 3,647,908 | 3/1972 | Medema et al. | 252/429 B X |
| 3,784,481 | 1/1974 | Lassau et al. | 252/431 C |
| 3,928,303 | 12/1975 | Yasui et al. | 252/431 C X |

*Primary Examiner*—Patrick P. Garvin
*Attorney, Agent, or Firm*—Karl F. Ross

[57] ABSTRACT

Olefin-polymerization catalysts having a catalytic activity much higher than related Ziegler catalysts are prepared by treating a compound of a transition element such as chromium, with at least one reagent selected from acetic acid, acetic anhydride and a chloroacetic or fluoroacetic acid, at 70° to 100° C for 10 to 30 hours, and treating the product, dispersed in an inert anhydrous non-polar solvent, with at least one aluminum alkyl.

4 Claims, 1 Drawing Figure

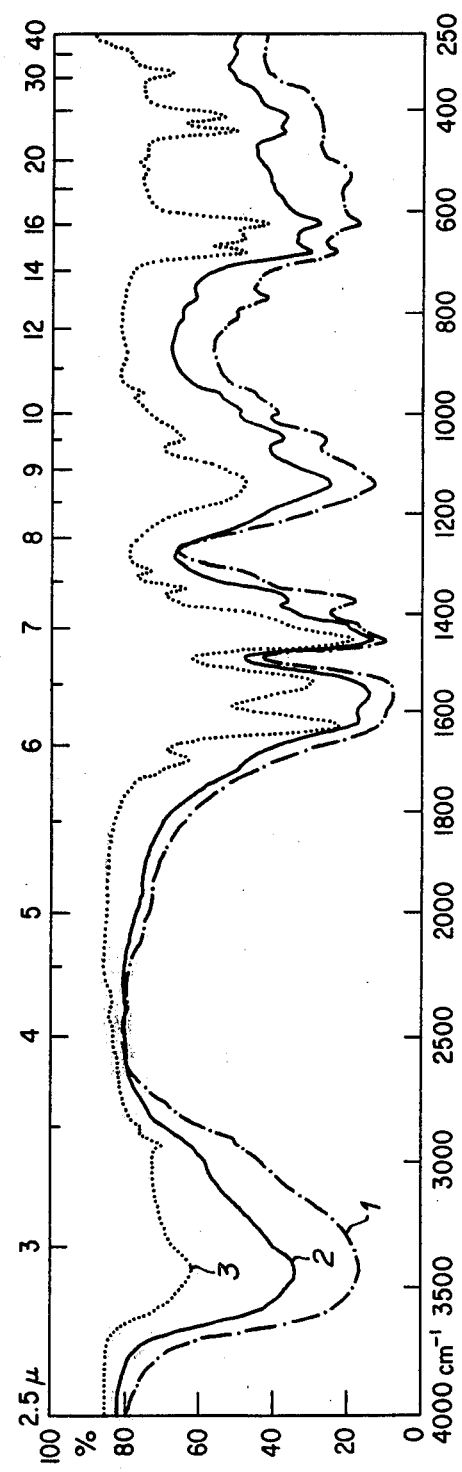

OLEFIN-POLYMERIZATION CATALYSTS

The present invention relates to a process for preparing an olefin-polymerization catalyst, and the use of this catalyst in polyolefin preparation. This use is particularly applicable to the preparation of polyethylene, polypropylene and ethylenepropylene copolymers by low-pressure polymerization or copolymerization, and enables these polymers to be obtained in a high melting point form.

Up to the present time, low-pressure polymerization of olefins has been carried out using catalysts of a very particular type generally known as "Ziegler catalysts". These catalysts consist of a mixture of at least one organometallic compound of a metal belonging to either group II or group III of the Periodic Table of elements, particularly aluminum or boron, and at least one compound of a transition metal belonging to group IVb, Vb or VIb of the Periodic Table. (Belgian patents Nos. 533 762, 534 792 and 534 888).

These catalysts have the disadvantage of containing large quantities of transition element compounds which are necessary to give sufficient catalytic activity for industrial requirements. The use of these catalysts results in strong coloration of the prepared polymers, requiring the polymers to be purified until they contain no further catalyst traces. This purification requires an additional operation, which increases the selling price of the product.

The object of the invention is to eliminate the aforementioned disadvantage. To this end, the catalyst preparation process according to the invention is characterized in that at least one compound of a transition element belonging to group Ib, IIb, IIIb, IVb, Vb or VIb of the Periodic Table of the elements is brought into contact with at least one acetylated compound selected from the group comprising acetic acid, acetic anhydride and the fluoroacetic and chloroacetic acids and their anhydrides, the mixture thus obtained is heated to a temperature of 70° to 100° C for a period of 10 to 30 hours, the excess acetylated compound is eliminated to give a solid residue, this residue is dispersed in a first inert anhydrous non-polar organic solvent, part of the dispersion so formed is introduced into an inert anhydrous non-polar organic solvent identical with the first solvent or miscible with it, the quantity introduced being so small that the liquid medium thus obtained remains homogeneous, and at least one aluminum organometallic compound of the general formula $Al_n R_y X_{(3n-y)}$ is introduced into this latter medium, where R is an alkyl group and X is a halogen, and $n$ is 1 and $y$ is 1, 2 or 3, or $n$ is 2 and $y$ is 3 or 5.

The aforementioned Periodic Table of the elements is that published in the following work: Handbook of Chemistry and Physics, 52nd edition (1971-1972) (The Chemical Rubber Co., Cleveland, Ohio, U.S.A.).

The preferred aluminum organometallic compound used is diethyl aluminum chloride, $Al(C_2H_5)_2Cl$.

The preferred transition element compound used is an acetate, in particular chromium acetate monohydrate, $Cr(CH_3COO)_3.H_2O$. A different compound could equally be used, such as a chloride, an acetyl acetonate etc., in particular a compound of one of the following metals: copper, cadmium, lanthanum, titanium, zirconium, vanadium, niobium, tantalum, molybdenum, tungsten or chromium.

The process according to the invention is based on the heat treatment of a compound of a transition element in an anhydrous medium, in the presence of at least one acetyl compound chosen from the group heretofore specified. The mechanisms of the physico-chemical processes occurring during the heat treatment are not known. However, a color change in the transition element compound is observed (for example chromium acetate monohydrate changes from violet to green), together with a large increase in the ability of the treated compound to disperse or dissolve in an inert non-polar organic solvent, in particular in anhydrous benzene. In effect, whereas acetates or chlorides of transition elements belonging to the aforementioned specified group are practically insoluble in anhydrous benzene if not subjected to the heat treatment heretofore described, they disperse easily in this solvent after undergoing this treatment, to form a solid suspension in a clear liquid having the color taken by the acetate during its previously mentioned color change, and it is very easy to make this suspension homogeneous by simple moderate agitation. Where a compound other than an acetate, for example a chloride is used as the transition element compound, it is probable that this compound is transformed into the corresponding anhydrous acetate, at least in a transitory phase of the operation of the process.

However, this acetate is obtained in a "modified" form different from that of an acetate obtained without using the process according to the invention and not subjected to the activation treatment according to this process. The modification concerned may be demonstrated particularly by spectrographic analysis. The infrared absorption spectrum for the "modified" transition element compound comprises in particular a characteristic absorption peak at a wavelength of approximately 1630 cm$^{-1}$ (6,135 microns). This peak is totally absent in the infrared absorption spectrum for a corresponding transition element acetate not subjected to the activation treatment or "modification" according to the process forming the object of the present application.

The accompanying FIGURE represents the infrared absorption spectra for three specimens of trivalent chromium acetate.

Curve 1 shows the variation (expressed as a percentage) in the transmission of infrared radiation as a function of the radiation wavelength for a specimen of trivalent chromium acetate monohydrate, $Cr(CH_3COO)_3.H_2O$, which has not undergone the activation treatment according to the invention.

Curve 2 is the infrared absorption curve for a specimen of trivalent chromium acetate monohydrate subjected to the treatment according to the invention at a temperature of 40° C (i.e. below the lower limit of the useful temperature range for the treatment as heretofore specified).

Curve 3 is the infrared absorption curve for a specimen of trivalent chromium acetate monohydrate subjected to the treatment according to the invention at a temperature of 80° C (i.e. within the useful temperature range for the treatment as specified).

A comparison of these three infrared absorption curves shows that only the curve corresponding to the specimen subjected to activation treatment within the useful temperature range comprises the aforesaid characteristic absorption peak (1630 cm$^{-1}$). The catalytic activity of the transition element compound in the catalyst obtained by the process according to the invention is much greater than that of the transition element compounds in "Ziegler catalysts."

The value of this catalytic activity is given by the ratio of the weight (expressed in grams) of solid polyolefin (i.e. excluding the low molecular weight polyolefins obtained in the liquid state) obtained by olefin polymerization in the presence of the catalyst, to the product of the weight (expressed in grams) of transition metal used in the catalyst and the duration of polymerization (in hours):

Catalytic activity =

$$\frac{\text{Weight of solid polyolefin (grams)}}{\text{Duration of polymerization (hours)} \times \text{weight of transition metal (grams)}}$$

Where chromium acetate monohydrate and diethyl aluminum chloride are used for preparing an ethylene-polymerization catalyst, the catalytic activity lies, for example, between approximately 16,000 and 180,000 for a catalyst prepared by the process according to the invention, according to the cpolymerization conditions and the quantity of catalyst used, and for a given volume of anhydrous organic solvent in the enclosure in which the polymerization is carried out, and of the order of 0.2 for a "Ziegler catalyst" likewise based on chromium acetate and diethyl aluminum chloride, but in which the chromium acetate has not undergone any special treatment prior to its mixing with the aluminum organometallic compound.

Consequently the heat treatment of the transition metal acetate in accordance with the process of the invention results in the "modification" or "activation" of the compound in such a manner that the quantity of the compound that has to be used in a catalyst for preparing a given weight of polyolefin is much less than in the case of "Ziegler catalysts." Moreover, this "modification" treatment of the transition metal compound surprisingly enables the quantity of aluminum organometallic compound which has to be used to obtain a catalyst of a given catalytic activity to be also considerably reduced.

Where the transition element compound is an acetate or acetyl acetonate, it has been found that the highest values of catalytic activity are obtained when the "activation" treatment of the compound is carried out using as the acetylated compound a mixture of equal volumes of acetic acid and acetic anhydride, the order of these values decreasing when pure acetic acid or pure acetic anhydride are used (see examples 16, 25 and 24).

EXAMPLE 1

In a thoroughly dry 1 liter glass flask provided with a reflux column and 3 grinding balls, 1.1 grams of chromium acetate hydrate in fine powder form $(Cr(CH_3COO)_3.H_2O)$, corresponding to 4.45 millimoles of chromium, are mixed at ambient temperature (20° C) and under an anhydrous nitrogen atomsphere (pressure slightly greater than 1 kg/cm$^2$) with forty milliliters of pure anhydrous acetic acid and forty milliters of pure anhydrous acetic anhydride. The contents of the flask are brought to 90° C over a period of one hour while rotating the flask. The mixture color, which is initially violet at ambient temperature, becomes green when its temperature reaches around 70° C and preserves this color irreversibly.

The temperature is held at 90° C by heating over 20 hours under a continuous dry nitrogen atmosphere, the interior of the flask being protected against any air entry by means of a mercury seal.

The acetic acid and anhydride are then evaporated under reduced pressure (firstly 30 mm Hg and finally 10 mm Hg). A solid green residue is obtained which is dried by heating in a nitrogen atmosphere for 48 hours at a temperature increasing progressively from 90° to 120° C, the nitrogen atmosphere being in contact with a sufficient quantity of phosphorus pentoxide $P_2O_5$ such that this latter preserves its white color to the end of the treatment.

The dry solid green residue so obtained is dispersed in 500 milliliters of pure anhydrous benzene ("absolute" benzene). A suspension of fine particles of green powder in an equally green liquid is obtained.

An analysis of this suspension (liquid + solid) indicates that it contains 205 mg of chromium per liter corresponding to 1 mg of chromium to 4.88 ml of suspension.

500 milliliters of pure anhydrous benzene are introduced into a glass autoclavve of one liter internal volume previously dried at 90° C under vacuum for 10 hours, provided with a rotary mechanical agitator and designed to support a maximum internal pressure of 16 atmospheres, after purging the interior of the autoclave by a current of anhydrous nitrogen at atmospheric pressure.

7.5 ml of the suspension prepared as heretofore described and corresponding to 1.0 mg of chromium (0.02 millimoles) are introduced into the autoclave while agitating the liquid medium (600 r.p.m.). A perfectly clear colorless medium is obtained, in which it is not possible to recognize any solid phase. One milliliter of diethyl aluminum chloride $(Al(C_2H_5)_2Cl)$, corresponding to 8 millimoles thereof, is introduced into this liquid medium under agitation (molar ratio: $\frac{\text{diethyl aluminum chloride}}{\text{chromium}} = 10^2$).

A perfectly clear colorless liquid is likewise obtained.

The nitrogen atmosphere is then replaced by dry ethylene and a pressure of 10 kg/cm$^2$ is established inside the autoclave while continuing agitation of the liquid medium. The medium temperature is 20° C. At the end of one minute, a whitish cloud begins to appear in the liquid, and after one hour the autoclave contains a solid white precipitate which has practically absorbed the entire liquid phase. This precipitate is dried by heating under a pressure lower than atmospheric. Total weight of precipitate: 55.2 grams, corresponding to a "catalytic activity" of 55,200.

This precipitate is identified as being polyethylene by infrared spectrography. It is found by dynamic thermogravimetric analysis under an atomsphere of air that the product does not decompose in practice before about 430° C. Melting point (measured by differential thermal analysis) : 145° C.

EXAMPLE 2

The procedure of example 1 is repeated, but using 51.2 ml of the "modified" chromium acetate suspension, corresponding to 10.5 mg of chromium (0.2 millimoles) and carrying out the ethylene polymerization under atmospheric pressure instead of under a pressure of 10 kg/cm$^2$. 40 millimoles of diethyl aluminum chloride are used instead of 8 millimoles. 2,200 ml of benzene are used in the polymerization enclosure as the organic solvent.

91.5 g of polyethylene are obtained, corresponding to a catalytic activity of 9,150.

EXAMPLES 3 to 40

The procedure described in the previous examples is followed, but using as the transition element compound those compounds specified in the table given hereinafter, which also indicates the quantities of transition element compound expressed in milligrams of the corresponding element and in millimoles, the quantities of diethyl aluminum chloride expressed in millimoles, the experimental parameters of the ethylene polymerization (temperature, pressure, duration, volume of anhydrous benzene used as the diluent), the weight of ethylene obtained in each example and the corresponding value of the catalytic activity (table 1).

Observations on table 1 a. Nature of the aluminum organometallic compound Al $R_x X_y$:
   Diethyl aluminum chloride (Al $(C_2H_5)_2$ Cl) in the case of examples 3 to 19 and 24 to 40 inclusive;
   Triethyl aluminum trichloride (Al$_2$ $(C_2H_5)_3$ Cl$_3$) in the case of example 20;
   Triethyl aluminum (Al $(C_2H_5)_3$) in the case of example 21;
   Triisobutyl aluminum (Al (iso'$C_4H_9$)$_3$) in the case of example 22, and
   Tri-n-butyl aluminum (Al (n—$C_4H_9$)$_3$) in the case of example 23.

b. Nature of the acetylated compound used for activating the transition element compound :
   mixture of equal volumes of pure anhydrous acetic acid and pure anhydrous acetic anhydride in the case of examples 3 to 23 inclusive, examples 29 to 33 inclusive and 39 and 40;
   Pure anhydrous acetic anhydride in the case of example 24;
   Pure anhydrous acetic acid in the case of example 25 and examples 34 to 38 inclusive;
   Mixture of equal volumes of pure anhydrous trifluoracetic acid, CF$_3$ COOH, and pure anhydrous trifluoracetic anhydride (CF$_3$ CO)$_2$O, in the case of example 26;
   Pure anhydrous trifluoracetic acid in the case of example 27, and Trichloracetic anhydride (C Cl$_3$ CO)$_2$O in the case of example 28.

c. Nature of the organic liquid solvent used in the Polymerization enclosure:
   Pure anhydrous benzene in the case of examples 3 to 28 inclusive an 33 to 40 inclusive;
   Pure anhydrous toluene in the case of example 29;
   Prue anhydrous xylene in the case of example 30;
   Pure anhydrous normal heptane in the case of example 31, and
   Pure anhydrous normal hexane in the case of example 32.

EXAMPLES 41 to 48

Propylene is Polymerized in a manner analogous to that described in the previous examples, under the conditions and with the results indicated in the table given hereinafter (table 2).

EXAMPLE 49

A copolymer of ethylene and propylene is prepared in a manner analogous to that described in the previous examples, starting from 100 milliliters of liquid propylene under an ethylene pressure of 10 atmospheres, under the conditions and with the results given hereinafter :

| Polymerization Conditions : | |
|---|---|
| Temperature | : 20 – 30° C |
| Pressure | : 10 atmospheres |
| Duration | : 5 hours |
| Volume of anhydrous benzene | : 400 milliliters. |

Nature of the transition element compound
TiCl$_3$.

Quantity of transition element 2.1 m.moles (100 mg)

Quantity of diethyl aluminum chloride 16 m.moles

Weight of copolymer obtained 51.01 grams

Value of catalytic activity $$\frac{\text{Weight of ethylene-propylene copolymer (grams)}}{\text{Duration of polymerization} \times \text{Quantity of transition element}} =$$
$$\text{(hours)} \qquad \text{(grams)}$$

102.05

Example 50 (comparative)

The procedure of example 7 is followed (using VCl$_3$ as the transition element compound), but without subjecting the vanadium trichloride to treatment by the mixture of acetic acid and acetic anhydride, and operating under the following conditions:

| Polymerization conditions : | |
|---|---|
| temperature | : 20 – 35° C |
| Pressure | : 5 – 10 atmospheres |
| Duration | : 3 hours |
| Volume of anhydrous benzene | : 200 ml. |

Quantity of transition element 10 millimoles (1520 mg)

Quantity of diethyl aluminum chloride 30 millimoles

Weight of polyethylene obtained 9.7 grams
(In addition 2.5 grams of an oily product are obtained, consisting of a polyethylene of very low molecular weight).

Catalystic activity 2.1
(Compared with the value of 2,180 obtained in the case of example 7).

This comparative example shows the considerable increase in catalytic activity obtained relative to a corresponding catalyst of "Ziegler catalyst" type, by operating the process according to the invention.

| Example No. | Nature of transition element compound (initial state) | Periodic Table Group | Quantity of transition element (millimoles) | Quantity of transition element (milligrams) | Quantity of aluminium organometallic compound (AlR$_x$X$_y$) | Polymerization conditions Temp. °C | Press. atm | Duration h | Vol. solvent ml | Wt. of solid polyethylene (g) | Catalytic activity = wt. of solid polyethylene (g) / duration of polymerization (h) |
|---|---|---|---|---|---|---|---|---|---|---|---|
| 3 | Cu(CH$_3$COO)$_2$·H$_2$O | Ib | 0.8 | 50 | 8 | 20 | 10 | 20 | 400 | 0.65 | 0.65 |
| 4 | Cd(CH$_3$COO)$_2$·3H$_2$O | IIb | 1.9 | 210 | 7 | 20 | 10 | 1 | 400 | 1.05 | 4.8 |
| 5 | La(CH$_3$COO)$_3$·1H$_2$O | IIIb | 0.6 | 85 | 8 | 20 | 10 | — | 400 | 0.85 | 10.0 |
| 6 | ZrCl$_4$ | IVb | 0.5 | 45.5 | 8 | 20 | 10 | — | 400 | 0.5 | 10.0 |
| 7 | VCl$_3$ | Vb | 0.185 | 9.4 | 8 | 20-32 | 10 | 11 | 400 | 11.1 | 11.1 |
| 8 | NbCl$_5$ | Vb | 0.001 | 0.01 | 8 | 20 | 10 | — | 400 | 20.5 | 2,180 |
| 9 | TaCl$_5$ | Vb | 5.5×10$^{-4}$ | 0.01 | 8 | 20 | 10 | — | 400 | 0.35 | 1,750 |
| 10 | MoCl$_5$ | VIb | 0.0044 | 4.2 | 8 | 25 | 10 | 20 | 400 | 40.25 | 1,250 |
| 11 | WCl$_6$ | VIb | 5.5×10$^{-4}$ | 0.1 | 8 | 20 | 10 | 20 | 400 | 1.3 | 310.0 |
| 12 | TiO(C$_5$H$_7$O$_2$)$_2$ (titanium acetyl acetonate) | IVb | 0.042 | 2 | 8 | 20 | 10 | 10 | 200 | 0.15 | 150.0 |
| 13 | TiC$_{16}$H$_{28}$O$_6$ (diisopropyl-oxy-titanium-bis-acetyl acetonate) | IVb | 0.1 | 5.0 | 4 | 20-30 | 6-10 | 1 | 400 | 28.6 | 14,300 |
| 14 | Zr(C$_5$H$_7$O$_2$)$_4$ (Zirconium acetyl acetonate) | IVb | 0.22 | 20 | 8 | 20 | 10 | 10 | 200 | 51.5 | 10,200 |
| 15 | V(C$_5$H$_7$O$_2$)$_3$ (Vanadium acetyl acetonate) | Vb | 0.02 | 1 | 8 | 20-35 | 10 | 1 | 300 | 10.5 | 52.5 |
| 16 | Cr(CH$_3$COO)$_3$·H$_2$O | VIb | 0.019 | 1.0 | 6.5 | 20-25 | 10 | 1 | 300 | 6.8 | 6,800 |
| 17 | CrCl$_2$ | VIb | 0.019 | 1.0 | 8 | 20-30 | 10 | 1 | 500 | 58.0 | 58,000 |
| 18 | Cr(C$_5$H$_7$O$_2$)$_3$ (chromium acetyl acetonate) | VIb | 0.019 | 1.0 | 8 | 20-30 | 10 | 1 | 200 | 75.0 | 75,000 |
| 19 | Mn(CH$_3$COO)$_2$·2H$_2$O | VIIb | 0.38 | 21 | 8 | 20 | 10 | 20 | 400 | 53.5 | 53,000 |
| 20 | Cr(CH$_3$COO)$_3$·H$_2$O | VIb | 0.019 | 1.0 | 8 | 20 | 10 | 1 | 300 | 1.9 | 4.5 |
| 21 | " | " | 0.019 | 1.0 | 20 | 20-30 | 10 | 20 | 400 | 14.6 | 14,600 |
| 22 | " | " | 0.019 | 1.0 | 8 | 20-40 | 10 | 5 | 200 | 6.8 | 340 |
| 23 | " | " | 0.019 | 1.0 | 4 | 20-38 | 10 | 1 | 400 | 7.2 | 1,430 |
| 24 | " | " | 0.08 | 4.16 | 4 | 20-38 | 10 | 1 | 200 | 27.6 | 27,600 |
| 25 | " | " | 0.08 | 4.16 | 8 | 20-25 | 10 | 1 | 200 | 24.5 | 5,900 |
| 26 | " | " | 0.08 | 4.16 | 6.5 | 20 | 10 | 3 | 200 | 66.9 | 16,000 |
| 27 | " | " | 0.08 | 4.16 | 6.5 | 20 | 10 | 2 | 200 | 21.2 | 5,000 |
| 28 | " | " | 0.08 | 4.16 | 6.5 | 20 | 10 | 1 | 300 | 5.5 | 442 |
| 29 | CrCl$_2$ | VIb | 0.019 | 1.0 | 6.5 | 20 | 10 | 1 | 200 | 3.1 | 370 |
| 30 | " | " | 0.019 | 1.0 | 6.5 | 20-40 | 10 | 1 | 300 | 47.5 | 47,500 |
| 31 | " | " | 0.019 | 1.0 | 6.5 | 20-26 | 10 | 5 | 300 | 13.4 | 13,400 |
| 32 | " | " | 0.019 | 1.0 | 6.5 | 20 | 10 | 2 | 300 | 21.5 | 4,300 |
| 33 | VO(C$_5$H$_7$O$_2$)$_2$ | Vb | 0.04 | 2 | 8 | 20-30 | 10 | 1 | 100 | 34.5 | 17,250 |
| 34 | TiCl$_4$ | IVb | 0.04 | 2 | 8 | 20-70 | 1-10 | 2 | 300 | 15.5 | 7,750 |
| 35 | ZrCl$_4$ | IVb | 0.024 | 2 | 8 | 25 | 10 | 2 | 200 | 44.5 | 11,100 |
| 36 | MoCl$_5$ | VIb | 0.052 | 5 | 8 | 25 | 10 | 1 | 300 | 1.9 | 950 |
| 37 | WCl$_6$ | VIb | 0.055 | 10 | 8 | 25 | 10 | 1 | 300 | 2.5 | 500 |
| 38 | TaCl$_6$ | Vb | 0.055 | 10 | 8 | 25 | 10 | 1 | 100 | 1.0 | 100 |
| 39 | Cr(CH$_3$COO)$_3$·H$_2$O | VIb | 0.019 | 1.0 | 6.5 | 20-30 | 10 | 1 | 500 | 3.6 | 360 |
| 40 | " | " | 0.019 | 1.0 | 6.5 | 20-30 | 50-60 | 1 | 500 | 80.1 | 80,100 |
|    |   |    |       |     |     |        |      |   |     | 151.0 | 151,000 |

Table 2

| Example No. | Polymerization Conditions Temp. °C | Press. atm | Duration h | Vol. of benzene ml | Transition element composition (initial state) | Periodic Table Group | Quantity of transition element m.moles | Quantity of transition element mg | Al . Et$_2$Cl quantity (m.moles) | Wt. of polypropylene (g) | Catalytic activity: Solid polypropylene (grams) / Duration of polymerization × Transition element quantity (g) |
|---|---|---|---|---|---|---|---|---|---|---|---|
| 41 | 30–60 | 6 | 2 | 250 | Cr(CH$_3$COO)$_3$ . H$_2$O | VIb | 0.6 | 31 | 2 | 3.0 | 48.5 |
| 42 | 60 | 9 | 2 | 200 | Cr(C$_5$H$_7$O$_2$)$_3$ | VIb | | 128 | 15 | 63.9 | 250.0 |
| 43 | 60–70 | 10 | 10 | 250 | VCl$_3$ | Vb | 1.45 | 75 | 20 | 5.6 | 7.5 |
| 44 | 70–80 | 10 | 10 | 200 | V(C$_5$H$_7$O$_2$)$_3$ | Vb | 3.9 | 200 | 15 | 24.6 | 12.3 |
| 45 | 20–60 | 4–8 | 18 | 300 | NbCl$_5$ | Vb | 3.0 | 277 | 15 | 2.1 | 0.4 |
| 46 | 60 | 8 | 18 | 300 | TaCl$_5$ | Vb | 3.0 | 570 | 15 | 1.4 | 0.13 |
| 47 | 70 | 10 | 5 | 200 | TiO(C$_5$H$_7$O$_2$)$_2$ | IVb | 1.25 | 60 | 20 | 6.6 | 22.0 |
| 48 | 70 | 8 | 5 | 150 | ZrCl$_4$ | IVb | 1.0 | 90 | 8 | 1.5 | 2.2 |

I claim:

1. A process for preparing an olefin polymerization catalyst, in which at least one compound selected from the group which consists of acetates, chlorides and acetyl acetonates of a transition element belonging to group Ib, IIb, IIIb, IVb, Vb or VIb of the Periodic Table of elements is brought into contact with at least one "acetyl" compound selected from the group consisting of acetic acid, acetic anhydride and the fluoracetic and chloroacetic acids and their anhydrides, the mixture thus obtained is heated to a temperature of 70° to 100° C for a time of 10 to 30 hours, the excess "acetyl" compound is eliminated to give a solid residue, this residue is dispersed in a first inert anhydrous non-polar solvent, part of the dispersion so formed is introduced into an inert anhydrous non-polar organic solvent identical with the first solvent or miscible with it, the quantity introduced being so small that the liquid medium thus obtained remains homogeneous, and at least one aluminum organometallic compound of the general formula $Al_nR_yX_{(3n-y)}$ is introduced into this latter medium, where R is an alkyl group and X is a halogen, and $n$ and 1 and $y$ is 1, 2 or 3, or $n$ is 2 and $y$ is 3 or 5, the molar ratio of the aluminum organometallic compound to transition element being from 3.7:1 to 1060:1.

2. Process as claimed in claim 1, in which the aluminum organometallic compound is diethyl aluminum chloride $Al(C_2H_5)_2Cl$.

3. Process as claimed in claim 1, in which said transition element compound is chromium acetate monohydrate $Cr(CH_3COO)_3 \cdot H_2O$.

4. Process as claimed in claim 1, in which a mixture of acetic anhydride and acetic acid is used as "acetyl" compound.